No. 862,453. PATENTED AUG. 6, 1907.
T. B. DOTY.
HARROW.
APPLICATION FILED FEB. 27, 1907.
2 SHEETS—SHEET 1.
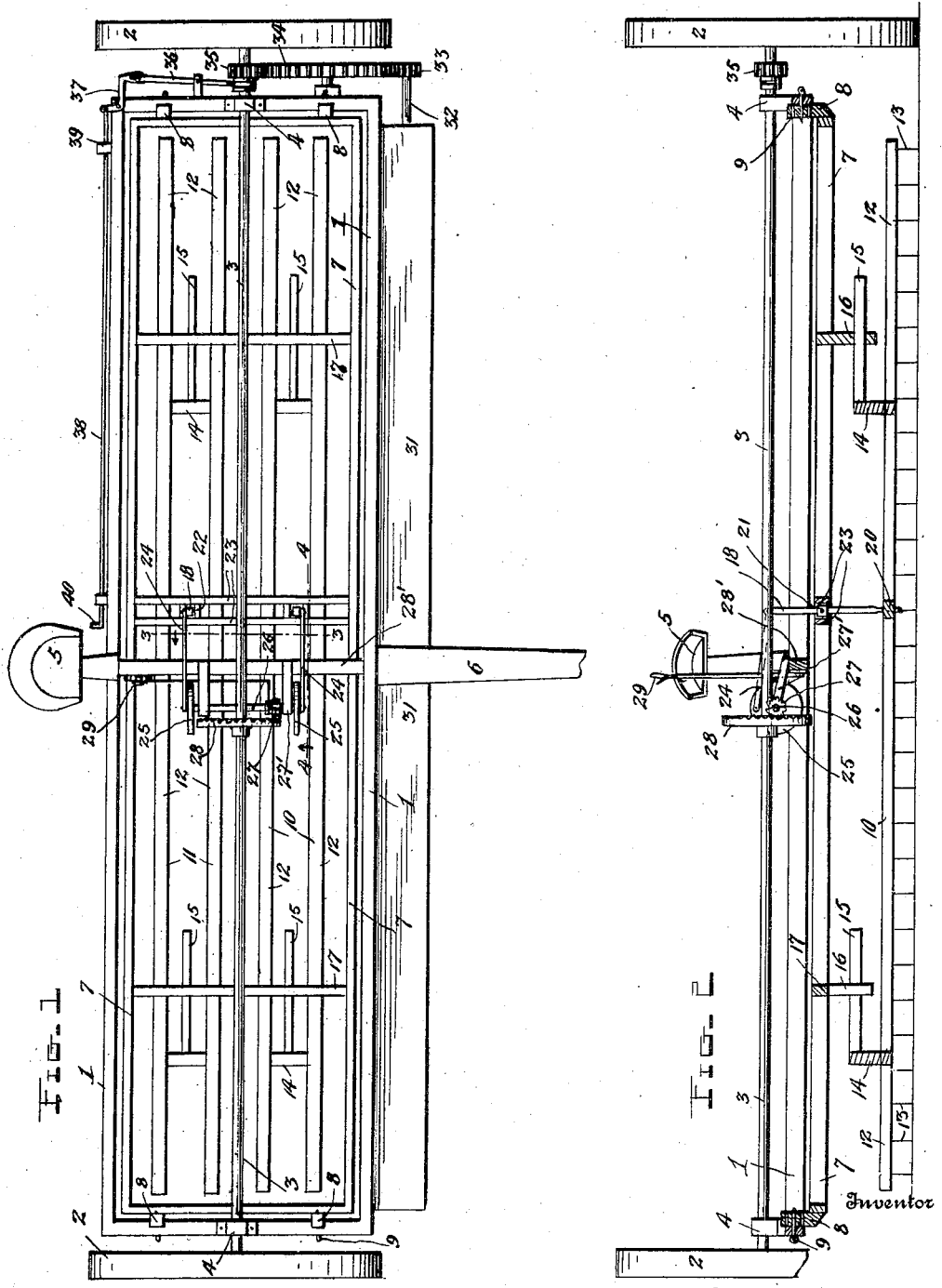

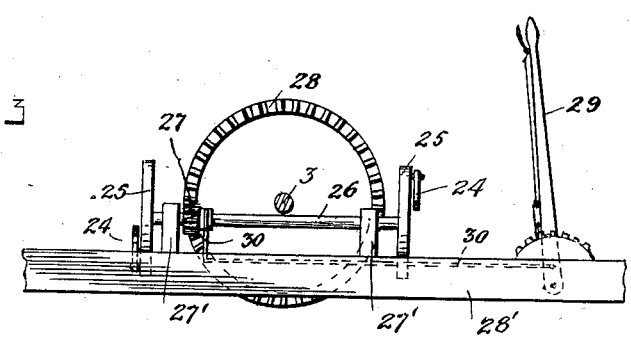
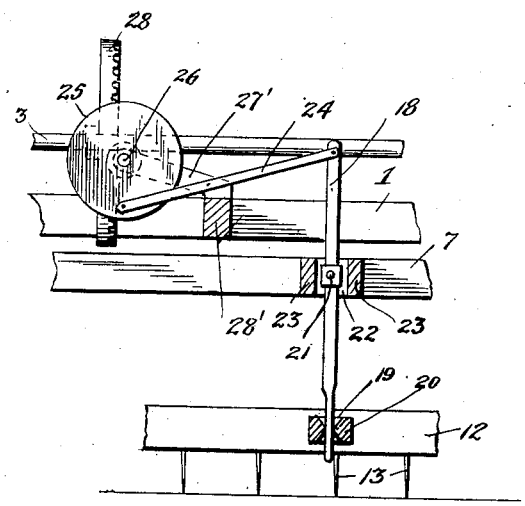
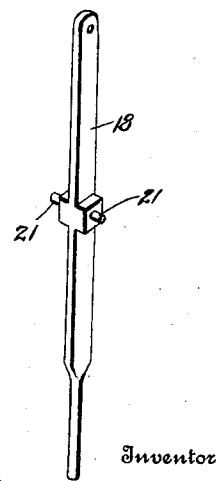

UNITED STATES PATENT OFFICE.

THOMAS B. DOTY, OF BEECHER CITY, ILLINOIS.

HARROW.

No. 862,453.

Specification of Letters Patent.

Patented Aug. 6, 1907.

Application filed February 27, 1907. Serial No. 359,613.

*To all whom it may concern:*

Be it known that I, THOMAS B. DOTY, a citizen of the United States, residing at Beecher City, in the county of Effingham and State of Illinois, have invented certain new and useful Improvements in Harrows, of which the following is a specification, reference being had therein to the accompanying drawing.

My invention relates to improvements in harrows.

The object of the invention is to provide a machine of this character which will be simple and durable in construction and very effective for the purpose intended.

With the above and other objects in view, the invention consists in the novel construction, combination and arrangement of parts hereinafter described and claimed, and illustrated in the accompanying drawings, in which Figure 1 is a plan view of the improved machine; Fig. 2 is a vertical longitudinal section through the same; Figs. 3 and 4 are detail sections taken on the planes indicated respectively by the lines 3—3 and 4—4 in Fig. 1; and Fig. 5 is a perspective view of one of the levers for oscillating the harrow sections.

The machine comprises a horizontal main frame 1 preferably of rectangular form. It is supported by wheels 2 upon the ends of an axle or shaft 3 from which it is suspended by bearings or hangers 4 arranged at its ends. The driver's seat 5 is arranged at the center of the rear of the frame and a draft tongue or pole 6 projects forwardly from the center of its front.

Vertically adjustable within the main frame 1 is a harrow supporting frame 7 also of rectangular form. While the frame 7 may be adjusted vertically toward and from the ground in any suitable manner, I have shown its ends provided with upwardly projecting blocks 8 which slidably engage the ends of the frame 1 and are formed with vertical series of apertures which aline with apertures in the ends of the frame 1 to receive removable locking pins 9, as clearly shown in Fig. 2. It will be seen that by changing the pins 9 to different apertures in the blocks or uprights 8, the elevation of the frame 7 may be varied. The frame 7 carries front and rear longitudinally extending harrow sections 10, 11 each of which consists of bars 12 provided with depending harrow teeth 13 and connected by cross bars 14. These harrow sections 10, 11 are adapted to be reciprocated longitudinally of the frame and transverse the direction of the movement of the machine so that the teeth 13 will effectively harrow the ground and also cover the seed which is dropped in front of the machine, as presently explained. To permit said sections to be reciprocated, they are mounted for sliding movement upon the frame 7 by providing upon the bars 14 horizontally arranged longitudinally extending slide bars 15 which pass through and slide in depending hangers 16 arranged upon cross bars 17 in the frame 7.

The harrow sections are oscillated by vertically arranged levers 18 the lower ends of which have a loose connection 19 with cross bars 20 which connect the tooth bars 12, as shown in Figs. 2 and 4 of the drawings. The levers 18 have oppositely projecting fulcrum studs 21 arranged intermediate their ends and adapted to be mounted in spaced bearing blocks 22 arranged between a pair of cross bars 23 which connect the longitudinal side bars of the frame 7, as seen in Fig. 1. This mounting of the levers permits them to oscillate in a vertical plane longitudinally of the frame of the machine so that the harrow sections will be reciprocated across the path or line of movement of the machine. The upper ends of the levers are connected by pitmen 24 to crank disks 25 secured upon the ends of a transverse shaft 26 mounted in bearings 27' upon a cross bar 28' which connects the two longitudinal bars of the frame 1. Slidably but non-rotatably mounted on the shaft 26 is a pinion 27 which meshes with the teeth of a crown gear 28 secured upon the shaft or axle 3. When the pinion 27 meshes with the gear 28 and the machine is drawn forwardly by draft animals the motion of the axle 3 will be imparted to the shaft 26 so that the harrow sections will be oscillated. The pinion 27 may be shifted longitudinally on the shaft 26 to move it out of mesh with the gear 28 by operating a hand lever 29 which is connected by a shipper rod 30 to said pinion, as clearly shown in Fig. 3.

Suitably mounted upon the front of the frame 1 is a seed hopper 31 containing suitable seed dropping mechanism which is operated by a shaft 32 projecting longitudinally from one end of said box. The shaft 32 carries a pinion 33 which meshes with a gear 34 suitably journaled upon the adjacent end of the frame 1 and adapted to mesh with a pinion 35 which latter is slidably but non-rotatably mounted upon the axle 3. This gearing causes the motion of the axle 3 to be imparted to the shaft 32 for operating the seed dropping mechanism in the box 31. The pinion 35 may be thrown out of mesh with the gear 34 by means of a shipper lever 36 suitably pivoted upon the frame 1 and loosely connected to one arm of a bell crank 37 also mounted upon said frame. The other arm of the bell crank is connected to one end of a rod 38 mounted in guides 39 upon the rear of the frame 1 and having a foot piece 40 at its opposite end.

When the machine is to be used for planting oats or other seed, the pinions 35 and 27 are caused to mesh respectively with their gears 34 and 28 and as the machine is drawn forwardly by the draft animals, the seed will be dropped from the box 31 in front of the machine and the harrow sections 10, 11 will be reciprocated so that their teeth 13 will harrow the ground and cover the seed. When it is desired to use the machine simply as a harrow, the foot piece 40 is operated to throw the seed dropping mechanism out of gear and the hand lever 29 may also be operated to throw the mechanism which reciprocates the harrow sections out of gear.

Having thus described my invention what I claim and desire to secure by Letters Patent is:

1. A machine of the character described comprising a wheel supported main frame of rectangular form, a vertically adjustable frame within the main frame and having cross bars and hangers depending from said cross bars and apertured, a harrow section carrying longitudinally and horizontally disposed slide bars to slide in the apertures in said hangers, a cross bar upon said harrow section and formed with an aperture, a lever fulcrumed intermediate its ends upon said adjustable frame and having its lower end projecting loosely into the aperture in the last mentioned cross bar and means upon the main frame oscillating said lever.

2. A machine of the character described comprising a frame, a transverse shaft rotatable in bearings thereon, supporting wheels upon said shaft, a harrow section carried by said frame and mounted for reciprocation, said harrow section having a bar formed with an aperture, a lever fulcrumed intermediate its ends upon the frame and having its lower end loosely engaged with the aperture in said bar, a gear upon said shaft, a transverse shaft, a pinion upon the latter in mesh with said gear, a crank disk upon said transverse shaft and a pitman connecting said crank disk and the upper end of said lever.

3. A machine of the character described comprising a wheel supported main frame, a vertically slidable frame adjustably arranged within the main frame, the hangers 16 depending from said adjustable frame and formed with transverse apertures, a harrow section, the horizontal slide bars 15 connected to said harrow sections and spaced above the same and adapted to slide in the apertures in said hangers, and means for reciprocating said harrow section, substantially as described.

In testimony whereof I hereunto affix my signature in presence of two witnesses.

THOMAS B. DOTY.

Witnesses:
 WILSON W. DOTY,
 WILLIAM S. BARR.